April 2, 1940.    J. F. HIGBEE    2,195,487
DUAL WHEEL ASSEMBLY
Filed Nov. 10, 1936    3 Sheets-Sheet 1

INVENTOR
James F. Higbee
BY
Morgan, Finnegan and Durham
ATTORNEYS

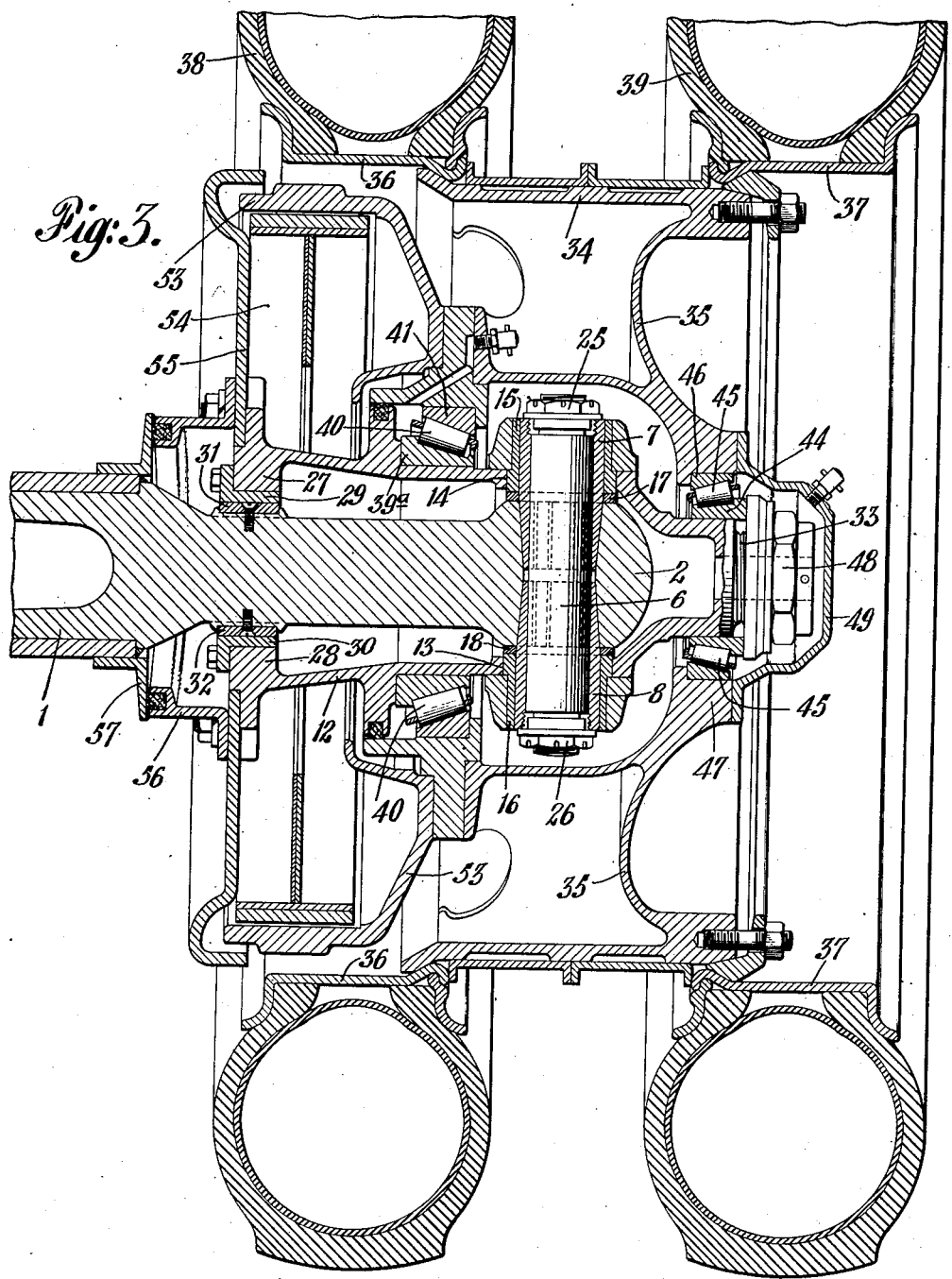

April 2, 1940.　　　　　J. F. HIGBEE　　　　　2,195,487
DUAL WHEEL ASSEMBLY
Filed Nov. 10, 1936　　　　3 Sheets-Sheet 3
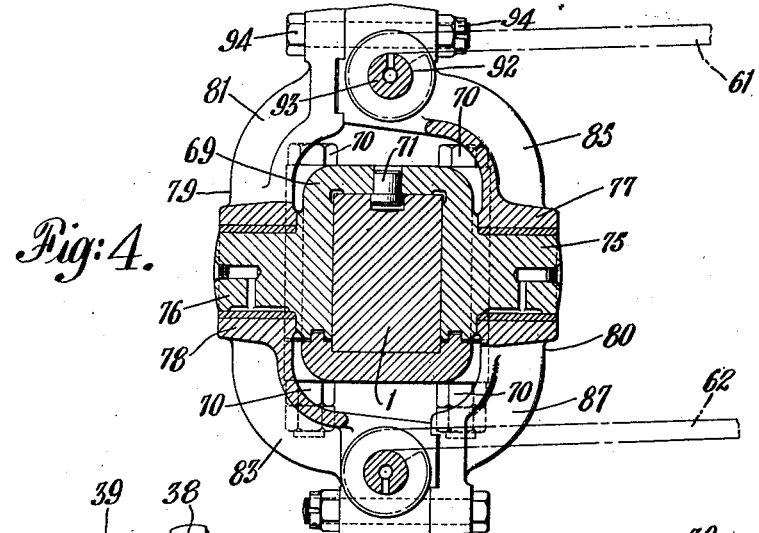
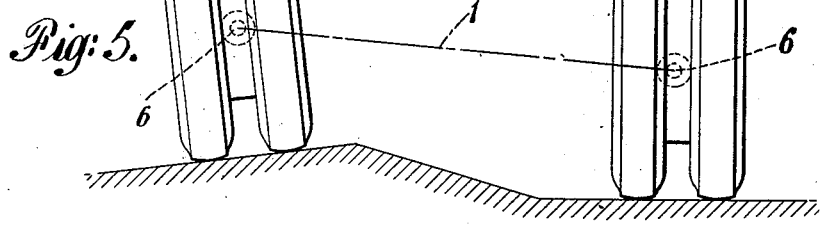
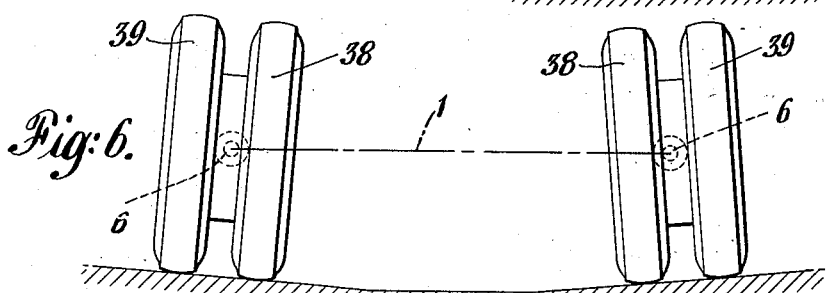
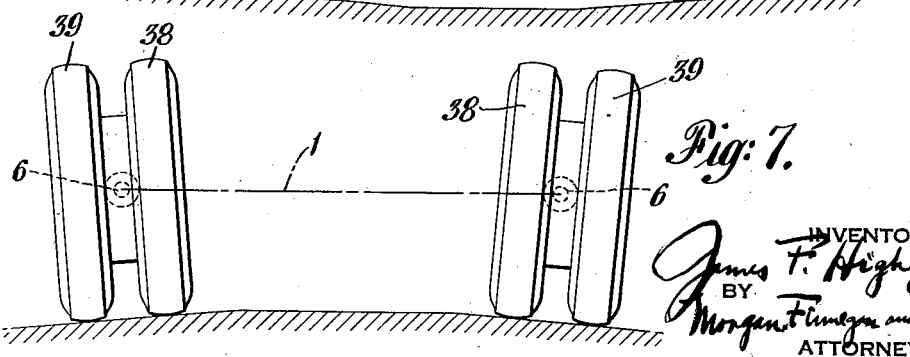

Patented Apr. 2, 1940

2,195,487

UNITED STATES PATENT OFFICE 2,195,487

DUAL WHEEL ASSEMBLY

James F. Higbee, Detroit, Mich.

Application November 10, 1936, Serial No. 110,052

2 Claims. (Cl. 280—124)

The invention relates to new and useful improvements in dual wheel and axle assemblies and more especially to such improvements in dual wheel and axle assemblies especially designed for heavy duty vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 3 is an enlarged horizontal section on line 3—3 of Fig. 1;

Fig. 4 is an enlarged vertical section on line 4—4 of Fig. 1; and

Figs. 5, 6 and 7 are diagrammatical views showing the action of the mechanism in different road conditions.

Figure 1:
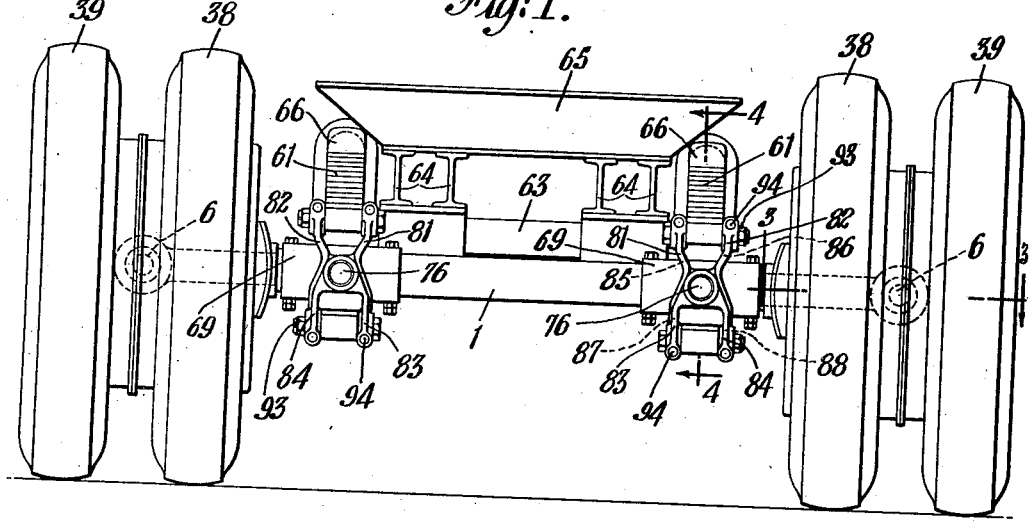
Figure 1 is an elevation of a wheel and axle assembly embodying the invention.

Some objects of the invention are to provide superior dual wheel assemblies or mechanism capacitated to effect or maintain equal road contact for all the tires irrespective of irregularities in roads in order to avoid uneven and excessive wear and deterioration of tires; to provide an axle and dual wheel assembly in which the wheel has free vertical angular movement with respect to the axle while it is restrained from any horizontal angular relative movement; to provide such wheel units at either end of the axle and to provide for relative angular movement vertically between the axle and bolster or chassis with a view to effecting the desired uniform contact of all tires with the road; to provide simple, sturdy and economical mechanism for effecting the aforesaid objects; and to provide mechanism for realizing the foregoing and other objects which will stand up and survive under the hard and exacting conditions of heavy vehicular traffic.

The present preferred embodiment comprises a comprehensive vehicle-supporting unit including two axles, each of the axles having at either end a dual wheel with two tires, the axles being connected at either end to a pair of compound leaf springs which support a single central bolster. Each of these wheel structures at either end of the axle is connected to the axle by a horizontally-disposed pivot bearing, located medianly with respect to the two tires of the wheel, whereby the wheel and pair of tires have camber or vertical angular movement with respect to the axle so as to conform to variations in the surface of the road for the purpose of keeping both tires uniformly in contact with the road. The tires may be relatively rotatable with respect to each other, or fixed to rotate together without substantially affecting the main function just described. The shackles for the leaf springs are mounted on the axle by bearings which permit relative rotation between them and the axles, which also contributes to give free and complete adaptation of each axle and its dual wheel units to variations in the surface of the road. It will be understood that the foregoing general description and the following detailed description as well are exemplary and explanatory but are not restrictive of the invention.

Referring now in detail to the embodiment of the invention illustrated by way of example in the accompanying drawings, the axle 1 has an enlarged end 2 within which is a horizontally disposed opening for holding the pivot bearing pin which permits the vertical angular motion between the axle and the dual wheel. This opening is slightly conical, decreasing in diameter from the ends toward the middle of the opening. Within this cylindrical opening is the pivot pin 6, which is within two bushings 7 and 8, which bushings are cylindrical on the inside to fit the pin and are conoidal on the outside to fit the inwardly tapered opening in the head 2 of the axle.

Mounted freely upon the pivot pin 6 is a wheel structure member which is non-rotatable, but has angular relative movement vertically with respect to the axle, the dual wheel being rotatably mounted upon said wheel structure member so that the wheel has both free rotational movement along the road and the desired vertical angular relative movement with respect to its axle. As embodied, said wheel structure comprises a hollow conoidal part 12 which encircles the axle, and which has at either side horizontally disposed openings 13 and 14, in which openings are journalled bushings 15 and 16, which bushings in turn are mounted on the outer ends of the bushings 7 and 8, respectively. Spacing washers 17 and 18 are mounted between the inner faces of the bushings 15 and 16 and the abutting side faces of the axle head 2. The entire pivot bearing assembly is held in position by nuts 25 and 26 screw-threaded on the ends of the pivot pin 6.

At its inner end the wheel structure member 12 is provided with guiding and aligning means cooperating with the axle to permit vertical relative movement between it and the axle, about the pivot pin 6, but to guard the wheel structure against any relative horizontal movement or play. For this purpose, the wheel structure at its inner end and at either side thereof has flanges 27 and 28 extending inwardly toward the sides of the axle, to which flanges are fixed vertically-disposed contact pieces 29 and 30, the vertical faces of which slide on and are laterally supported by the contacting faces of two vertically disposed strips 31 and 32, fixed on the axle 1 at either side thereof. The wheel structure 12 at its outer end, that is, beyond the pivot bearing 6, is of companulate form terminating in an outwardly-projecting, hollow screw-threaded stud 33.

Referring now to the dual wheel structure which is rotatively mounted on the vertically and angularly movable wheel structure 12, a wheel 35 is shown having a cylindrical peripheral part 34, which carries at either side thereof rims 36 and 37, these rims carrying, respectively, tires 38 and 39, which all may be of any known or suitable construction and need not be described in detail. The wheel 35 is mounted upon the member 12 by means of double thrust bearings, that is, oppositely acting thrust bearings, and as shown, the inner bearing is located on the inside from pivot bearing 6, and has an annular, inclined raceway 39a mounted on the exterior of the member 12, in which raceway run the rollers 40. Resting on the rollers 40 is the inclined outer raceway 41 fixed to the wheel 35. The outer anti-friction thrust bearing is located exteriorly to the pivot pin 6, and comprises an annular inclined raceway 44, mounted on the exterior end of the wheel structure member 12, and in the raceway run the anti-friction rollers 45. The inclined raceway 46 rests upon the rollers 45, and is fixed to the hub portion 47 of the wheel. A locking nut 48 is screw-threaded upon the thread 33, and acts as an adjusting means for the bearing, and as a locking means to prevent the wheel backing off and to hold the bearing adjustment rigidly tight. A finishing cap 49 is placed over the end and is fixed to the wheel hub.

A brake drum 53 is fixed to the inner face of the wheel 35, and is provided with any suitable form of driver-operated controlling means such as a brake band 54. A flat, centrally apertured shield 55 encircles the axle 1 and covers the inner face of the brake drum, which shield is mounted on the inner face of the non-rotating wheel structure member 12. Fixed to the outer face of the flat shield 55 and encircling the axle 1 is a cylindrical lubricant container 56, which has an oil tight joint with a flanged cover 57 mounted upon the axle 1.

Figure 2:
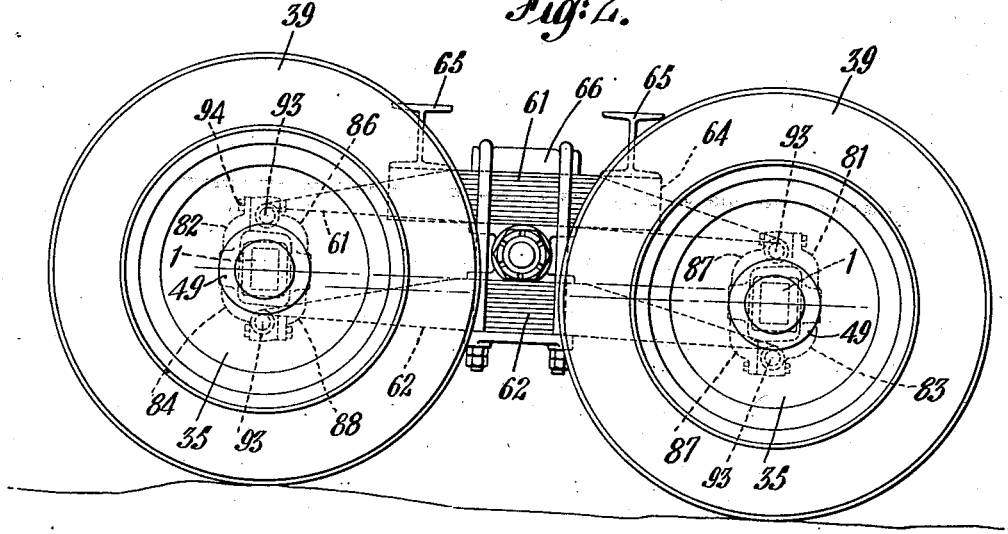
Fig. 2 is an elevation looking at Fig. 1 from the side.

In Figs. 1 and 2 are shown two axles, each having at either end thereof a wheel assembly such as that already described. These axles are mounted, respectively, in shackle bolts at the opposite ends of pairs of compound leaf springs 61 and 62, located at either side of the vehicle. These pairs of leaf springs at either side are connected by bolted saddles 66 to a transversely-disposed bolster 63, upon which or upon beams 64, 65 is carried a chassis structure of any known or other suitable form. Referring now to the mounting of the axle on the spring shackle bolt (Figs. 1, 2 and 4) the axle 1, which is rectangular in cross section, is shown mounted or enclosed in a correspondingly rectangular casing 69, the two parts of which are held together by a plurality of bolts 70. A pin 71 lying in holes in the top of the axle and of the saddle safeguards against relative longitudinal movement of the two.

To permit the vertical angular relative movement between the axle and its mounting, the casing 69 has projecting forwardly and rearwardly, respectively, from the central part of its front and rear vertical surfaces two trunnions 75 and 76. These trunnions are journalled, respectively, in hubs 77 and 78 formed in saddles 79 and 80. Saddle 79 has extending upwardly therefrom and hung from the shackle bolt 93 of the upper spring 61 arms 81 and 82, and this saddle has extending downwardly therefrom and hung from the shackle bolt of the lower spring 62, arms 83 and 84. Saddle 80 has similar upwardly extending arms 85 and 86 and downwardly extending arms 87 and 88, similarly connected to the shackle bolts. The two pairs of upwardly extending arms are curved inwardly to meet above the casing, having the eye 92 to take the shackle bolt 93, the two arms of each pair being connected together by a bolt 94. The underneath construction is the same or similar and need not be further described. The axis of the trunnions 75, 76 is substantially horizontal, intersects the axle and is perpendicular to the axis of the axle; the axes of the bolts 93 are substantially parallel to each other and to the axis of the axle. This structure permits free vertical and angular relative movement or scissoring of the axles without placing twisting strain or torque on the springs; that is, the springs supporting the chassis are not twisted laterally, but remain in their upright positions even though all four wheels should be at different elevations. The structure provides relatively easy and smooth riding for the vehicle, which is very desirable in transporting fragile articles, explosives and the like; and in practice it operates equivalently to flattening out uneven surfaces in the roadway, as when running over uneven surfaces it lifts the load only half as high as with the usual construction.

In Figs. 5, 6 and 7 are illustrated, somewhat diagrammatically, different positions of the dual wheels and the axle in conforming to road surfaces of different shapes or contours so as to keep all of the tire treads continuously in full and uniform contact with the road surface irrespective of these changes in contour. It will be noted that adjustments or conformations of the road are made instantly and automatically and irrespective of whether or not the two tires are relatively rotatable with respect to each other.

The invention in its broader aspects is not limited to the specific mechanisms shown and described but departures may be made therefrom within the scope of the accompanying claims without departing from the principles of the invention and without sacrificing its chief advantages.

What I claim is:

1. In a heavy duty vehicle, the combination of an axle beneath the vehicle, a pair of dual wheels at each end of the axle, means for pivotally mounting the dual wheels on the axle, said mounting means including a horizontally disposed pivot mounted in the end of the axle, at right angles to the axis thereof, a non-rotatable wheel supporting structure pivotally mounted on said horizontal pivot, said structure surrounding the axle and extending outwardly and inwardly thereof on opposite sides of said horizontal pivot, cooperating, vertically disposed, relatively slidable means, carried respectively by the inner part of said non-rotatable structure and by the axle, for providing lateral support for, and permitting vertical movement of, the inner part of said non-rotatable structure, and means connecting the axle to the vehicle including springs secured to the axle by means having a horizontal pivot at right angles to the axle.

2. In a heavy duty vehicle, the combination of an axle beneath the vehicle, a pair of dual wheels at each end of the axle, means for pivotally mounting the dual wheels on the axle end so that they may move about a horizontal pivot and upper and lower spring members extending longitudinally of the vehicle and secured to the axle by mounting means comprising a trunnion member fixed to the axle and having alined fore and aft trunnions, the axis of the trunnions being horizontal and intersecting the axle, saddle means, pivotally mounted on said trunnions, and extending above and below the axle, horizontally disposed shackle bolts above and below the axle and parallel thereto, and pivotally mounted in the upper and lower portions of said saddle means, and means pivotally connecting said upper and lower spring members with said shackle bolts.

JAMES F. HIGBEE.